H. C. FRY.
MANUFACTURE OF GLASSWARE.
APPLICATION FILED MAY 7, 1908.
959,500.
Patented May 31, 1910.
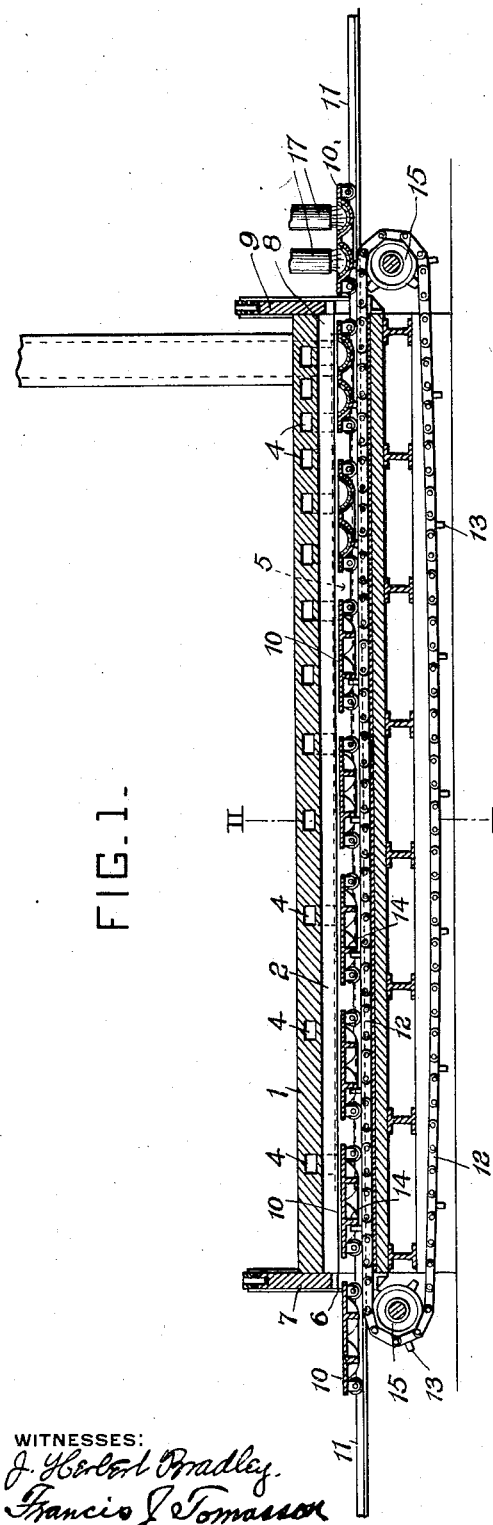
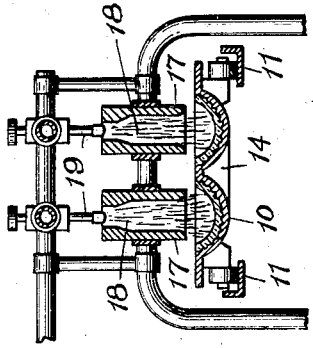
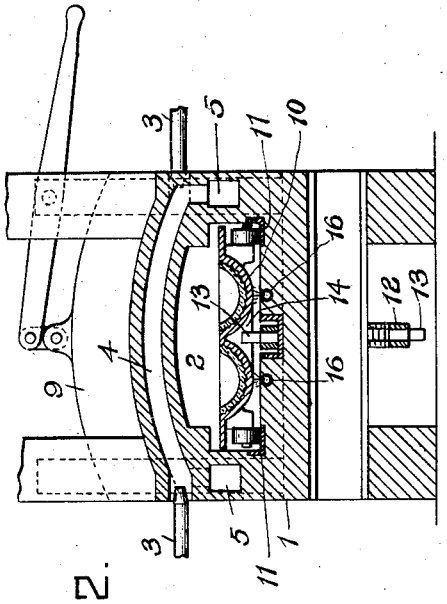
WITNESSES:
J. Herbert Bradley.
Francis J. Tomasso
INVENTOR
Henry C. Fry,
by Christy & Christy Atty's

UNITED STATES PATENT OFFICE.

HENRY C. FRY, OF ROCHESTER, PENNSYLVANIA.

MANUFACTURE OF GLASSWARE.

959,500.      Specification of Letters Patent.      Patented May 31, 1910.

Application filed May 7, 1908.  Serial No. 431,391.

*To all whom it may concern:*

Be it known that I, HENRY C. FRY, residing at Rochester, in the county of Beaver and State of Pennsylvania, a citizen of the United States, have invented or discovered certain new and useful Improvements in the Manufacture of Glassware, of which improvements the following is a specification.

The invention relates to the finishing of the surfaces of glass articles, and consists in a new and improved method which is particularly adapted to finishing the inner surfaces of pressed glass articles, which are intended to be cut or otherwise dressed and polished on the outer surfaces, to produce ware of high grade. It is well known that in pressing glass articles the plunger and die leave on the surface of the article imperfections, which must subsequently be completely eradicated if an article of high grade is desired. The imperfections on the outer surface may be removed by mechanical polishing, but it is impracticable to polish the inner surfaces of many forms of articles by mechanical means. It is also known that if a pressed glass article be allowed to cool below a certain point, its surface will become set, and a glaze will be formed thereon which will render the imperfections permanent, so that they cannot be removed by any known method of fire-finishing. Hence in the manufacture of pressed glass articles intended to be cut or otherwise converted into ware of superior finish and appearance, it has heretofore been necessary to remelt their inner surface before the article has lost so much of its initial heat as to permit the formation of the glaze which renders the imperfections permanent. Said method of finishing is described in Letters Patent of the United States No. 628,027, dated July 4th, 1899.

By the practice of the invention hereinafter described I am enabled to finish the surface of a pressed glass article, and eradicate all mold-marks and other imperfections, after the article has become cold, or after its temperature has been allowed to fall below the point at which the glaze above mentioned has formed on its surface.

Any suitable apparatus may be employed in the practice of the invention, that illustrated in the accompanying drawings, and hereinafter described, being merely one form which is well adapted thereto.

Figure 1 is a sectional elevation of the apparatus; Fig. 2 a cross-section on larger scale on the line II—II of Fig. 1; and Fig. 3 a sectional elevation of the remelting burners.

The numeral 1 indicates a heating-furnace or oven, provided with the chamber 2 which is heated by the burners 3, 3 arranged alternately on opposite sides of the furnace, and discharging into the flues 4, 4, passing through the crown of the furnace and connected by the longitudinal passages 5, 5 to the stack.

The numeral 6 indicates the entrance opening to the chamber, provided with the door 7, and 8 the delivery opening, provided with the door 9. The heating flues are so arranged, as shown on Fig. 1, that the glass articles in passing through the furnace are subjected to a gradually increasing temperature, so that they are gradually heated to a temperature above that at which the glaze above mentioned had originally formed on their surface. It is preferable that the glass articles should be heated gradually, since if they were exposed at once to a high temperature they would be in danger of being cracked or broken.

During their passage through the furnace the glass articles should be supported in matrices which fit closely upon their exterior, in order to guard against distortion. For this purpose I have shown the articles contained in the open supports 10, which may be made of any suitable material, such as iron, and may if desired be coated with asbestos or other refractory substance.

I have shown the supports 10 mounted on wheels running on ways 11, which rest upon the floor of the chamber 2, and for causing them to move through the chamber an endless chain 12, provided at proper intervals with dogs 13, adapted to engage depending pieces 14 on the supports 10. The chain 12 passes over wheels 15 arranged at the opposite ends of the furnace, and may be operated by any suitable means. If found desirable pipes 16 may be arranged along the floor of the chamber, provided with perforations through which cold air may be projected against the bottoms of the supports 10 to prevent their becoming so highly heated that the glass articles will stick to their inner surfaces.

Adjacent to the delivery end of the furnace are mounted the remelting burners 17. Each of these burners is shown as provided with a combustion chamber 18, lined with refractory material, and opening downwardly so as to direct the flame within a glass article placed beneath it, and remelt the inner surface of the article. Gaseous fuel is supplied to the combustion chamber of each burner from the nozzles 19. One or more remelting burners may be used, as found desirable, and arranged in any convenient way.

It is essential that the glass articles while exposed to the remelting flame shall be supported on their exterior walls, so as to prevent distortion, either by the supports 10 or by other suitable means.

In the practice of the invention with the apparatus described, the glass articles are placed in the supports 10 and are transported therein through the chamber 2 at such speed as will allow them to be gradually elevated in temperature to a point above that at which the glaze above mentioned had originally formed upon the surface to be finished. The degree of temperature of the formation of said glaze, and consequently the degree of temperature to which the articles must be reheated, varies according to the composition of the glass, and is well understood by those skilled in the art. When the articles have attained the desired temperature, and have reached the delivery end of the furnace, they are withdrawn from the chamber, and while still at a temperature above that of formation of the glaze, the surface to be finished is exposed to the flame of the remelting burner, by means of which said surface is thoroughly remelted, and all mold-marks and other surface imperfections are completely eradicated. The article is then allowed to cool, and is annealed in the usual manner.

Within the scope of the invention, the glass article may be gradually reheated in any suitable furnace or oven, or by any suitable means, and the surface to be finished, when raised to the proper temperature, may be remelted by any suitable means, it being only necessary that the article shall be gradually heated to a temperature above that of the formation of the glaze which prevents the removal of surface imperfections by fire-finishing, and while still above said degree of temperature, the surface to be finished shall be remelted.

I claim as my invention:

1. The method of finishing the surfaces of glass articles, which consists in gradually heating the surface to be finished to a degree of temperature above that of formation of the glaze, and then remelting the surface.

2. The method of finishing the surfaces of glass articles, which consists in gradually heating the article to a degree of temperature above that of formation of the glaze, and then remelting the surface to be finished.

3. The method of finishing the surfaces of glass articles, which consists in gradually heating the article to a degree of temperature above that of formation of the glaze, and then remelting the surface to be finished, maintaining the shape of the article throughout the operation, and then allowing the article to cool.

In testimony whereof, I have hereunto set my hand.

HENRY C. FRY.

Witnesses:
CHARLES BARNETT,
J. HERBERT BRADLEY.